United States Patent Office 3,072,473
Patented Jan. 8, 1963

---

3,072,473
PLANT GROWTH REGULANTS
Walter D. Harris, Naugatuck, Conn., assignor to United States Rubber Company, New York, N.Y., a corporation of New Jersey
No Drawing. Filed Oct. 7, 1959, Ser. No. 844,858
20 Claims. (Cl. 71—2.6)

This invention relates to plant growth regulants and herbicides.

It has been found that N-arylmalonamic acids and their esters and salts, and N,N'-diarylmalonamides, and N-alkyl-N-arylmalonamic acids and their esters and salts, and N,N'-dialkyl-N,N'-diarylmalonamides are effective plant growth regulants and herbicides. Typical growth regulant responses include growth inhibition, prevention of fruit drop, rooting of cuttings, formation of parthenogenetic fruit. The compounds may be considered as herbicidal toward undesirable perennial grasses, especially in the sense of preventing regrowth, when combined with plowing under.

The chemicals of the present invention are known and may readily be prepared in known manner from esters of malonic acid, e.g. methyl, ethyl, propyl, isopropyl, butyl, hexyl, octyl, decyl and dodecyl diesters of malonic acid. Heating equimolar amounts of the malonic acid ester and the selected aryl amine so as to drive off the alcohol as it is formed gives the corresponding ester of the N-aryl-malonamic acid. This reaction is not quantitative. There is always a certain amount of N,N'-diarylmalonamide and unchanged malonic ester at the end of the reaction period. The N-arylmalonamides are prepared by heating one mole of the malonic acid ester with two moles of the selected aryl amine. The free N-arylmalonamic acid is prepared by hydrolyzing the ester. The esters of N-alkyl-N-arylmalonamic acids and the N,N'-dialkyl-N,N'-diarylmalonamides are prepared similarly to the N-arylmalonamic acids and the N,N'-diarylmalonamides by reacting one or two moles of the selected N-alkyl-N-arylamine with the malonic ester. The salts are prepared by treating the free N-arylmalonamic acid or N-alkyl-N-arylmalonamic acid with sodium or potassium hydroxide or ammonia or an amine to form water-soluble salts, or with a water-soluble salt of a polyvalent metal such as calcium, cadmium, iron, copper or zinc to form salts which are only slightly soluble in water. As an illustration, heating one mole of aniline with one mole of ethyl malonate gives the ethyl ester of N-phenylmalonamic acid or ethyl malonanilate, and heating two moles of aniline with one mole of ethyl malonate gives N,N'-diphenylmalonamide or malonanilide, as shown in the following reactions:

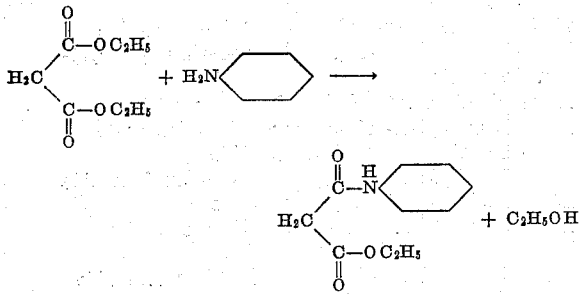

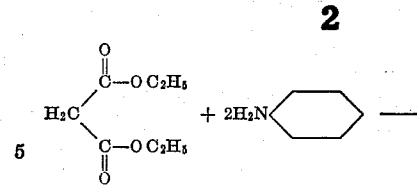

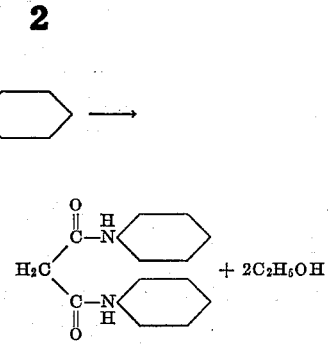

It is noted that the $CH_2$ group of the malonamic nucleus in the compounds of the invention is unsubstituted. The aryl group in the compounds of the invention may be a phenyl or naphthyl group which may be substituted as with alkyl, alkoxy, halo and nitro substituents.

The chemicals of the invention may be applied to the plants in an inert medium as a dust in admixture with a powdered solid carrier, such as the various mineral silicates, e.g. mica, talc, pyrophyllite and clays, or as an aqueous spray. The chemicals may be applied in admixture with small amounts of surface-active dispersing agents, which may be anionic, non-ionic, or cationic surface-active agents which may act as wetting agents to facilitate wetting of the plant surfaces to which they are applied, and as aids in dispersing the chemicals in water. The chemicals of the invention may be admixed with powdered solid carriers, such as mineral silicates, together with a small amount of such surface-active agent so that a wettable powder may be obtained which may be applied directly to plants, or which may be shaken up with water to readily prepare a suspension of the chemical and powdered solid carrier for application to plants in that form. They may also be applied as solutions in organic solvents, or as water emulsions of such solutions.

Anionic surface-active agents that may be used in the present growth regulant compositions are those having a general formula selected from the group consisting of R—COOM, R—$SO_3$M, and R—O$SO_3$M, where M represents alkali-metal, ammonium or substituted ammonium (amine) radical, and R represents an organic radical containing at least one group having more than 8 carbon atoms. Examples of such anionic surface-active agents are:

(1) Soaps of fatty and/or rosin acids, including dehydrogenated, hydrogenated and disproportionated rosin soaps (e.g. sodium laurate, ammonium stearate, diethanol-ammonium oleate, sodium salt of disproportionated rosin acid).

(2) Alkyl sulfonates (e.g. dodecyl sodium sulfonate, cetyl potassium sulfonate).

(3) Alkyl sulfates (e.g. sodium dodecyl sulfate, sodium oleyl sulfate).

(4) Sulfonated ethers of long and short chain aliphatic groups (e.g. $C_{17}H_{33}$—O—$C_2H_4$—$SO_3$Na).

(5) Sulfated ethers of long and short chain aliphatic groups (e.g. $C_{17}H_{33}$—O—$C_2H_4$—O—$SO_3$Na).

(6) Sulfonated alkyl esters of long chain fatty acids, e.g.

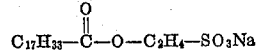

(7) Sulfated alkyl esters of long chain fatty acids, e.g.

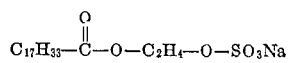

(8) Sulfonated alkyl substituted amides of long chain fatty acids, e.g.

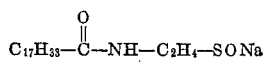

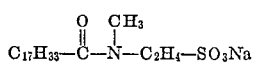

(9) Alkylated aryl sulfonates (e.g. isopropyl naphthalene sodium sulfonate; dodecyl benzene sodium sulfonate).

(10) Hydroaromatic sulfonates (e.g. tetra-hydro-naphthalene sodium sulfonate).

(11) Alkyl sulfosuccinates (e.g. dioctyl sodium sulfosuccinate).

(12) Aryl sulfonate-formaldehyde condensation products, e.g. condensation product of formaldehyde and sodium naphthalene sulfonate,

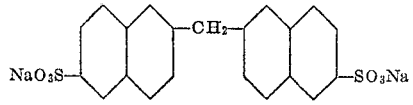

Non-ionic surface-active agents that may be used in the present growth regulant compositions are:

(1) Monoethers of polyglycols with long chain fatty alcohols, such as reaction products of ethylene oxide or polyethylene glycol with a long chain fatty alcohol (e.g. reaction product of ethylene oxide and oleyl alcohol, viz:

where $n$ is 10 to 20).

(2) Monoesters of polyglycols with long chain fatty acids, such as reaction products of ethylene oxide or polyethylene glycol with a long chain fatty acid (e.g. reaction product of ethylene oxide or polyethylene glycol with oleic acid, viz:

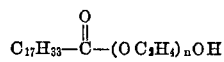

where $n$ is 10 to 20).

(3) Monoethers of polyglycols with alkylated phenols, such as reaction products of ethylene oxide or polyethylene glycol with an alkyl phenol (e.g. reaction product of ethylene oxide and isopropyl phenol, viz:

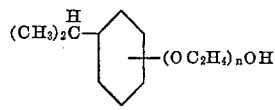

where $n$ is 10 to 20).

(4) Polyoxyethylene-polyoxypropylene glycols made by condensing ethylene oxide with hydrophobic base formed by the condensation of propylene oxide with propylene glycol (e.g. $H(OC_3H_6)_m(OC_2H_4)_nOH$ wherein the molecular weight of $(OC_3H_6)_m$ is 800 to 2500 and $(OC_2H_4)_n$ is 10% to 90% by weight of the molecule, such as $H(OC_3H_6)_{25-30}(OC_2H_4)_{8-12}OH$).

(5) Partial esters of polyhydric alcohols with long chain monocarboxylic (fatty and/or rosin) acids (e.g. glycerol monostearate, sorbitan trioleate).

(6) Partial and complete esters of long chain monocarboxylic (fatty and/or rosin) acids with polyglycol ethers of polyhydric alcohols (e.g. tristearic acid ester of polyglycol ether or sorbitan, or so-called polyoxyethylene sorbitan tristearate; hexaoleic acid ester of polyglycol ether of sorbitol, or so-called polyoxyethylene sorbitol hexaoleate).

Cationic surface-active agents that may be used in the present growth regulant compositions are:

(1) Quaternary ammonium salts in which one of the radicals attached to the nitrogen has an organic group containing at least 8 carbon atoms (e.g. trimethyl cetyl ammonium iodide, lauryl pyridinium chloride, cetyl dimethyl benzyl ammonium chloride, N-stearyl betaine).

(2) Amines, amides and diamines having an organic group containing at least 8 carbon atoms, and their acid salts (e.g. stearyl-amine hydrochloride, oleyl amide, diethylethylene oleyl diamine).

Examples of the plant growth regulants and herbicides of the present invention are:

Malonanilic acid
N-methylmalonanilic acid
Methyl malonanilate
Methyl N-methylmalonanilate
Ethyl malonanilate
Ethyl N-methylmalonanilate
Sodium malonanilate
Sodium N-methylmalonanilate
N,N'-diphenylmalonamide
N,N'-dimethyl-N,N'-diphenylmalonamide
N-(parachlorophenyl)malonamic acid
N-methyl-N-(parachlorophenyl)malonamic acid
Ethyl N-(parachlorophenyl)malonamate
Ethyl N-methyl-N-(parachlorophenyl)malonamate
Ethyl N-ethyl-N-(parachlorophenyl)malonamate
Ethyl N-propyl-N-(parachlorophenyl)malonamate
Ethyl N-butyl-N-(parachlorophenyl)malonamate
N,N'-di(parachlorophenyl)malonamide
N,N'-dimethyl-N,N'-di(parachlorophenyl)malonamide
Ethyl N-(metachlorophenyl)malonamate
Ethyl N-methyl-N-(metachlorophenyl)malonamate
N,N'-di(metachlorophenyl)malonamide
N,N'-dimethyl-N,N'-di(metachlorophenyl)malonamide
Ethyl N-(orthochlorophenyl)malonamate
Ethyl-N-methyl-N-(orthochlorophenyl)malonamate
N,N'-di(orthochlorophenyl)malonamide
N,N'-dimethyl-N,N'-di(orthochlorophenyl)malonamide
Ethyl N-(2,4-dichlorophenyl)malonamate
Ethyl-N-methyl-N-(2,4-dichlorophenyl)malonamate
N,N'-di(2,4-dichlorophenyl)malonamide
N,N'-dimethyl-N,N'-di(2,4-dichlorophenyl)malonamide
Ethyl N-(2,5-dichorophenyl)malonamate
Ethyl-N-methyl-N-(2,5-dichlorophenyl)malonamate
N,N'-di(2,5-dichlorophenyl)malonamide
N,N'-dimethyl-N,N'-di(2,5-dichlorophenyl)malonamide
Isopropyl N-(2,5-dichlorophenyl)malonamate
Isopropyl N-methyl-N-(2,5-dichlorophenyl)malonamate
Hexyl N-(2,4,5-trichlorophenyl)malonamate
Hexyl N-methyl-N-(2,4,5-trichlorophenyl)malonamate
Dodecyl N-(2-methyl-4-chlorophenyl)malonamate
Dodecyl N-methyl-N-(2-methyl-4-chlorophenyl)-
    malonamate
Diethanolammonium N-(2,4-dimethylphenyl)-
    malonamate
Diethanolammonium N-methyl-N-(2,4-dimethylphenyl)-
    malonamate
Ethyl N-(2-nitro-3-chlorophenyl)malonamate
Ethyl N-methyl-N-(2-nitro-3-chlorophenyl)malonamate
N,N'-di(2-nitro-3-chlorophenyl)malonamide
N,N'-dimethyl-N,N'-di(2-nitro-3-chlorophenyl)-
    malonamide
Ethyl N-(2-methoxy-5-chlorophenyl)malonamate
Ethyl N-methyl-N-(2-methoxy-5-chlorophenyl)-
    malonamate
N,N'-di(2-methoxy-5-chlorophenyl)malonamide
N,N'-dimethyl-N,N'-di(2-methoxy-5-chlorophenyl)-
    malonamide
Ethyl N-(alpha-naphthyl)malonamate
Ethyl N-methyl-N-(alpha-naphthyl)malonamate
N,N'-di(alpha-naphthyl)malonamide
N,N'-dimethyl-N,N'-di(alpha-naphthyl)malonamide
Ethyl N-(beta-naphthyl)malonamate
Ethyl N-methyl-N-(beta-naphthyl)malonamate
N,N'-di(beta-naphthyl)malonamide
N,N'-dimethyl-N,N'-di(beta-naphthyl)malonamide
Ethyl N-(2-methyl-alpha-naphthyl)malonamate Ethyl N-methyl-N-(2-methyl-alpha-naphthyl)malonamate
N,N'-di(2-methyl-alpha-naphthyl)malonamide
N,N'-dimethyl-N,N'-di(2-methyl-alpha-naphthyl)-malonamide The effectiveness of the chemicals of the present invention as plant growth regulants and herbicides is illustrated in the following examples.

Example 1

Water dispersions or solutions containing 500 parts per million of various chemicals of the present invention were prepared by mixing the chemicals with about 5% of their weight of Antarox A–200 (a commercial surface-active dispersing and wetting agent which is an alkyl aryl ether of a polyethylene glycol, i.e. a reaction product of ethylene oxide and an alkylated phenol) and adding distilled water to the proper dilution. In the case of the water-insoluble free acids and their esters, and the amides, the chemicals and Antarox A–200 were dissolved in an amount of acetone equal to about four times the weight of the chemical before dilution with the water.

Tomato plants, 3–5 inches tall, having three full leaves were sprayed to run off with water dispersions of solutions prepared as above of ethyl malonanilate, ethyl N-(orthochlorophenyl)malonamate, N-(parachlorophenyl)-malonamic acid, sodium N-(parachlorophenyl)malonamate, diethanolammonium N-(parachlorophenyl)malonamate, ethyl N-(parachlorophenyl)malonamate, ethyl N-(2,4-dichlorophenyl)malonamate, ethyl N-(2,5-dichlorophenyl)malonamate, ethyl N-(2-nitro-3-chlorophenyl)malonamate, ethyl N-(beta-naphthyl)malonamate, ethyl N-(paraphenylazophenyl)-malonamate, N,N'-di(parachlorophenyl)malonamide, N,N'-di(2,5-dichlorophenyl)malonamide, N,N'-di(alpha-naphthyl)malonamide, and N,N'-di(beta-naphthyl)malonamide. The plants were placed in the greenhouse to dry overnight, and the following day were placed in a chamber having 100% humidity and a constant temperature of 75° F. After 24 hours, they were taken out and placed in the greenhouse. The plants were examined 14 days later and compared with untreated plants. Among the growth regulant effects of the chemicals were epinasty, stunting and the production of abnormal leaf shapes and internodes.

Example 2

Water dispersions or solutions containing 2000 parts per million of N-methyl-N-(parachlorophenyl)malonamic acid, sodium N-methyl-N-(parachlorophenyl)malonamate, diethanolammonium N-methyl-N-(parachlorophenyl)malonamate, and ethyl N-methyl-N-(parachlorophenyl)malonamate prepared similarly to the dispersions or solutions in Example 1 were sprayed to run off on tomato plants, 3–5 inches tall, having three full leaves. The plants were placed in the greenhouse to dry overnight, and the following day were placed in a chamber having 100% humidity and a constant temperature of 75° F. After 24 hours, they were taken out and placed in the greenhouse. The plants were examined 14 days later and compared with untreated plants. They showed growth stimulating effects similarly to the chemicals in Example 1. The plants showed elongation of the petiole and narrow elongation of the leaflets. The growth of the apical bud was inhibited resulting in shorter plants with fewer nodes as compared with the untreated control plants.

Example 3

Pots of mature Johnson grass, crabgrass, and witch grass were sprayed to run off with water dispersions containing 500 parts per million of the following chemicals prepared as in Example 1: ethyl malonanilate, ethyl N-(parachlorophenyl)malonamate, ethyl N-(2-methyl-alpha-naphthyl)malonamate, N,N'-di(orthochlorophenyl)malonamide, and N,N'-di(2,4-dichlorophenyl)malonamide. After an interval of 4–6 weeks, the plants were removed from the pots and compared with untreated plants of the same age. The chemicals stunted the roots of all three grasses.

Example 4

Emulsifiable concentrates of ethyl N-(parachlorophenyl)malonamate and ethyl N-(2,4-dichlorophenyl)malonamate were prepared by dissolving 10 parts of the chemical in 100 parts of xylene containing 1 part of Antarox A–200. A 2000 parts per million emulsion of each of the chemicals was prepared by pouring 4 grams of the concentrate into 200 ml. of water. Boxes containing both broad leaf and grassy weed species were sprayed to run off with the emulsions of the chemicals. Percent weed control was determined after 10 days. The ethyl N-(parachlorophenyl)malonamate showed 100 percent control of the broad leaf weeds and 20 percent control of the grassy weeds. The ethyl N-(2,4-dichlorophenyl)-malonamate showed 97 percent control of each of the broad leaf weeds and grassy weeds. The xylene emulsion without the chemicals had no effect on the broad leaf weeds and a very slight effect on grassy weeds.

This is a continuation-in-part of application Serial No. 735,365, filed May 15, 1958, now abandoned.

Having thus described my invention, what I claim and desire to protect by Letters Patent is:

1. An agricultural chemical composition comprising material selected from the group consisting of N-arylmalonamic acids and their alkyl esters having one to twelve carbon atoms in the alkyl esterifying group, esters and their sodium, potassium, ammonium, amine, calcium, cadmium, iron, copper and zinc salts, and N,N'-diarylmalonamides, and N-lower alkyl-N-arylmalonamic acids and their alkyl esters having one to twelve carbon atoms in the alkyl esterifying group, esters and their sodium, potassium, ammonium, amine, calcium, cadmium, iron, copper and zinc salts, and N,N'-di-lower alkyl-N,N'-diarylmalonamides in amount effective to alter the growth characteristics of plants, the N-aryl and N'-aryl radicals being selected from the group consisting of phenyl and naphthyl radicals and phenyl and naphthyl radicals having substituents selected from the group consisting of alkyl, alkoxy, halo and nitro substituents, said composition containing a surface-active dispersing agent.

2. An agricultural chemical composition comprising material selected from the group consisting of N-arylmalonamic acids and their alkyl esters having one to twelve carbon atoms in the alkyl esterifying group, esters and their sodium, potassium, ammonium, amine, calcium, cadmium, iron, copper and zinc salts, and N,N'-diarylmalonamides, and N-lower alkyl-N-arylmalonamic acids and their alkyl esters having one to twelve carbon atoms in the alkyl esterifying group, esters and their sodium, potassium, ammonium, amine, calcium, cadmium, iron, copper and zinc salts, and N,N'-di-lower alkyl-N,N'-diarylmalonamides in amount effective to alter the growth characteristics of plants, the N-aryl and N'-aryl radicals being selected from the group consisting of phenyl and naphthyl radicals and phenyl and naphthyl radicals having substituents selected from the group consisting of alkyl, alkoxy, halo and nitro substituents, said composition containing a surface-active dispersing agent and a powdered solid carrier.

3. An agricultural chemical composition comprising an alkyl ester of an N-arylmalonamic acid in amount effective to alter the growth characteristics of plants and a surface-active dispersing agent, the N-aryl radical being selected from the group consisting of phenyl and naphthyl radicals and phenyl and naphthyl radicals having substituents selected from the group consisting of alkyl, alkoxy, halo and nitro substituents, and the alkyl esterifying group having one to twelve carbon atoms.

4. An agricultural chemical composition comprising an alkyl ester of an N-methyl-N-arylmalonamic acid in amount effective to alter the growth characteristics of plants and a surface-active dispersing agent, the N-aryl 5. An agricultural chemical composition comprising ethyl malonanilate in amount effective to alter the growth characteristics of plants and a surface-active dispersing agent.

6. An agricultural chemical composition comprising ethyl N-(parachlorophenyl)malonamate in amount effective to alter the growth characteristics of plants and a surface-active dispersing agent.

7. An agricultural chemical composition comprising ethyl N-(2,4-dichlorophenyl)malonamate in amount effective to alter the growth characteristics of plants and a surface-active dispersing agent.

8. An agricultural chemical composition comprising ethyl N - methyl - N - (parachlorophenyl)malonamate in amount effective to alter the growth characteristics of plants and a surface-active dispersing agent.

9. An agricultural chemical composition comprising N - methyl - N - (parachlorophenyl)malonamic acid in amount effective to alter the growth characteristics of plants and a surface-active dispersing agent.

10. The method of regulating plant growth which comprises treating plants with material selected from the group consisting of N-arylmalonamic acids and their alkyl esters having one to twelve carbon atoms in the alkyl esterifying group, esters and their sodium, potassium, ammonium, amine, calcium, cadmium, iron, copper and zinc salts, and N,N'-diarylmalonamides and N-lower alkyl-N-arylmalonamic acids and their alkyl esters having one to twelve carbon atoms in the alkyl esterifying group esters and their sodium, potassium, ammonium, amine, calcium, cadmium, iron, copper and zinc salts, and N,N'-di-lower alkyl-N,N'-diarylmalonamides in amount effective to alter the growth characteristics of plants, the N-aryl and N'-aryl radicals being selected from the group consisting of phenyl and naphthyl radicals and phenyl and naphthyl radicals having substituents selected from the group consisting of alkyl, alkoxy, halo and nitro substituents.

11. The method of regulating plant growth which comprises treating plants with an alkyl ester of an N-arylmalonamic acid in amount effective to alter the growth characteristics of plants, the N-aryl radical being selected from the group consisting of phenyl and naphthyl radicals and phenyl and naphthyl radicals having substituents selected from the group consisting of alkyl, alkoxy, halo and nitro substituents, and the alkyl esterifying group having one to twelve carbon atoms.

12. The method of regulating plant growth which comprises treating plants with an alkyl ester of an N-methyl-N-arylmalonamic acid in amount effective to alter the growth characteristics of plants, the N-aryl radical being selected from the group consisting of phenyl and naphthyl radicals and phenyl and naphthyl radicals having substituents selected from the group consisting of alkyl, alkoxy, halo and nitro substituents.

13. The method of regulating plant growth which comprises treating the plants with ethyl malonanilate in amount effective to alter the growth characteristics of plants.

14. The method of regulating plant growth which comprises treating plants with ethyl N-(parachlorophenyl)malonamate in amount effective to alter the growth characteristics of plants.

15. The method of regulating plant growth which comprises treating the plants with ethyl N-(2,4-dichlorophenyl)malonamate in amount effective to alter the growth characteristics of plants.

16. The method of regulating plant growth which comprises treating plants with ethyl N-methyl-N-(parachlorophenyl)malonamate in amount effective to alter the growth characteristics of plants.

17. The method of regulating plant growth which comprises treating plants with N-methyl-N-(parachlorophenyl)malonamic acid in amount effective to alter the growth characteristics of plants.

18. The method of killing weeds which comprises treating weeds with material selected from the group consisting of N-arylmalonamic acids and their alkyl esters having one to twelve carbon atoms in the alkyl esterifying group, esters and their sodium, potassium, ammonium, amine, calcium, cadmium, iron, copper and zinc salts, and N,N'-diarylmalonamides and N-lower alkyl-N-arylmalonamic acids and their alkyl esters having one to twelve carbon atoms in the alkyl esterifying group esters and their sodium, potassium, ammonium, amine, calcium, cadmium, iron, copper and zinc salts, and N,N'-di-lower alkyl-N,N'-diarylmalonamides in amount effective to kill the weeds, the N-aryl and N'-aryl radicals being selected from the group consisting of phenyl and naphthyl radicals and phenyl and naphthyl radicals having substituents selected from the group consisting of alkyl, alkoxy, halo and nitro substituents.

19. The method of killing weeds which comprises treating weeds with an alkyl ester of an N-arylmalonamic acid in amount effective to kill the weeds, the N-aryl radical being selected from the group consisting of phenyl and naphthyl radicals and phenyl and naphthyl radicals having substituents selected from the group consisting of alkyl, alkoxy, halo and nitro substituents, and the alkyl esterifying group having one to twelve carbon atoms.

20. The method of killing weeds which comprises treating weeds with an alkyl ester of an N-methyl-N-arylmalonamic acid in amount effective to kill the weeds, the N-aryl radical being selected from the group consisting of phenyl and naphthyl radicals and phenyl and naphthyl radicals having substituents selected from the group consisting of alkyl, alkoxy, halo and nitro substituents.

References Cited in the file of this patent

UNITED STATES PATENTS

| | | |
|---|---|---|
| 2,709,648 | Ryker et al. | May 31, 1955 |
| 2,895,991 | Randall et al. | July 21, 1959 |

OTHER REFERENCES

Ramart-Lucas et al. in "Chemical Abstracts," vol. 28, 1934, col. 5807(7).

Price et al. in "Chemical Abstracts," vol. 41, 1947, col. 7389d.

George et al. in "Chemical Abstracts," vol. 49, 1955, col. 13924f.

UNITED STATES PATENT OFFICE
CERTIFICATE OF CORRECTION

Patent No. 3,072,473  January 8, 1963

Walter D. Harris

It is hereby certified that error appears in the above numbered patent requiring correction and that the said Letters Patent should read as corrected below.

Column 6, lines 29, 34, 47 and 52, column 7, line 29, and column 8, line 21, strike out ", esters", each occurrence; column 7, line 34 and column 8, line 25, strike out "esters", each occurrence.

Signed and sealed this 6th day of August 1963.

(SEAL)
Attest:

ERNEST W. SWIDER
Attesting Officer

DAVID L. LADD
Commissioner of Patents